(12) United States Patent
Kang et al.

(10) Patent No.: US 7,421,020 B2
(45) Date of Patent: Sep. 2, 2008

(54) CHANNEL EQUALIZING DEVICE AND METHOD OF DIGITAL BROADCASTING RECEIVING SYSTEM

(75) Inventors: Kyung Won Kang, Seoul (KR); In Hwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 689 days.

(21) Appl. No.: 11/010,020

(22) Filed: Dec. 13, 2004

(65) Prior Publication Data

US 2005/0129143 A1    Jun. 16, 2005

(30) Foreign Application Priority Data

Dec. 12, 2003    (KR) .................. 10-2003-0090703

(51) Int. Cl.
H03H 7/30    (2006.01)
(52) U.S. Cl. .................................... 375/232
(58) Field of Classification Search .......... 375/229–236
See application file for complete search history.

(56) References Cited

U.S. PATENT DOCUMENTS

2003/0067899 A9 * 4/2003 Chen et al. .................. 370/335
2004/0156460 A1 * 8/2004 Kim et al. .................... 375/350
2006/0039460 A1 * 2/2006 Fimoff et al. ................ 375/233

FOREIGN PATENT DOCUMENTS

JP    2000-004190    1/2000

* cited by examiner

Primary Examiner—Kevin Y Kim
(74) Attorney, Agent, or Firm—Lee, Hong, Degerman, Kang & Schmadeka

(57) ABSTRACT

A channel equalizing device and method of a digital broadcasting receiving system in which a digital broadcasting signal received over a channel is compensated for a channel distortion to recover an original signal is provided. The channel equalizing device includes: a channel estimating unit for estimating and outputting a channel impulse response of a signal, which is received over a transmission channel; a channel characteristic detecting unit for determining as to whether a channel characteristic is a dynamic channel or a static channel by using a difference between the channel impulse response estimated at a current time and outputted from the channel estimating unit and the channel impulse response estimated at a previous time; and a channel equalizing unit for controlling a parameter of an internal filter depending on the channel characteristic detected by the channel characteristic detecting unit, to compensate the received signal for the channel distortion.

17 Claims, 7 Drawing Sheets

CHANNEL EQUALIZING DEVICE AND METHOD OF DIGITAL BROADCASTING RECEIVING SYSTEM

This application claims the benefit of the Korean Application No. 10-2003-0090703 filed on Dec. 12, 2003, which is hereby incorporated by reference.

BACKGROUND OF THE INVENTION

1. Field of the Invention

The present invention relates to a digital broadcasting receiving system, and more particularly, to a channel equalizing device and method of a terrestrial digital TV signal transmitted using a Vestigial Side Band (VSB) technology.

2. Discussion of the Related Art

In U.S.A., ATSC 8T-VSB transmission system is adopted and standardized in 1995 to provide a terrestrial digital broadcasting from the latter half of 1998 until now. In South of Korea, the same ATSC 8T-VSB transmission system as in U.S.A. is adopted and standardized to provide an experimental broadcasting on May 1995, and is converted into a test broadcasting system on Aug. 31, 2000, and is under broadcasting at each broadcasting service corporation since October, 2000.

Additionally, in a digital communication system, digital information of a transmission system is mapped using a symbol and each symbol is converted into an analog signal proportional to a magnitude or a phase to transmit the converted analog signal to a receiving stage over a transmission channel. While the signal reaching the receiving system (that is, ATSC 8T-VSB receiving system) passes through a multi-path transmission channel, it causes an inter-symbol-interference. Accordingly, it is essential to employ a channel equalizer for channel compensation, to recover an original signal from the distorted signal.

Generally, as a widely used channel equalizer, there is a Decision Feedback Equalizer (DFE) using a Least Mean Square (LMS) algorithm. In case where a signal is received over a multi-path channel, the DFE has a main path through which a great energy enters, and regards all signals, which enter through remaining paths, as inter-symbol-interference (ISI) or ghost signals entering through a reflection path. After that, the DFE corrects and extracts a phase and a magnitude of only signal entering through the main path and eliminates the signals entering through the remaining paths.

FIG. 1 is a block diagram illustrating a general decision feedback equalizer operating at a time domain.

In a brief description with reference to FIG. 1, a feed forward filter 101 eliminates the influence of signals of the path reaching earlier than those of the main path. Additionally, a feedback filter 102 eliminates the influence of signals of the path reaching later than those of the main path. In the figure, an adder 105 adds an output of the feed forward filter 101 and an output of the feedback filter 102 to output the added result to a decision unit 103. The decision unit 103 compares an output of the adder 105 with a predetermined reference signal level to decide a reference signal level most close to the output signal of the adder 105 as a decision value. At this time, the output of the decision unit 103 is fed-back to the feedback filter 102 and the controlling unit 104. That is, not the output of the adder 105, but the decision value of the decision unit 103 is inputted to the feedback filter 102.

Meanwhile, the controlling unit 104 receives the output of the equalizer, that is, the output of the adder 105 and the decision value of the decision unit 103 to update the coefficient of the feed forward filter 101 and the feedback filter 102.

In case where the decision unit 103 performs an correct decision, an output of the decision feedback equalizer is again inputted to the feedback filter 102 with noise eliminated from an equalizer output component. Therefore, noise enhancement is minimized, thereby providing an excellent performance in comparison to a general linear equalizer.

At this time, the decision feedback equalizer uses the LMS algorithm in such a way that a coefficient of a filter is updated. A step-size used in the LMS algorithm has an upper limit which is determined to stably operate the channel equalizer by a length of the filter and a degree of channel distortion. Within the upper limit, as the step-size is large, a compensation performance for a time-varying channel impulse response is improved at a dynamic channel whereas an excess Mean Square Error (MSE) is increased at a static channel to reduce an immunity for the noise generated at the channel.

Alternatively, at a duration not having a training sequence, a dynamic channel equalization performance and a static channel equalization performance are influenced depending on a blind algorithm, which is widely used to adapt the channel equalizer.

SUMMARY OF THE INVENTION

Accordingly, the present invention is directed to a channel equalizing device and method of a digital broadcasting receiving system that substantially obviates one or more problems due to limitations and disadvantages of the related art.

An object of the present invention is to provide a channel equalizing device and method of a digital broadcasting receiving system in which an estimated channel impulse response is used to determine as to whether a channel characteristic is a dynamic channel or a static channel and control a parameter of a channel equalizer suitably to the determined channel characteristic, thereby improving a performance of channel equalization.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a channel equalizing device of a digital broadcasting receiving system in which a digital broadcasting signal received over a channel is compensated for a channel distortion to recover an original signal, the device including: a channel estimating unit for estimating and outputting a channel impulse response of a signal, which is received over a transmission channel; a channel characteristic detecting unit for determining as to whether a channel characteristic is a dynamic channel or a static channel by using a difference between the channel impulse response estimated at a current time and outputted from the channel estimating unit and the channel impulse response estimated at a previous time; and a channel equalizing unit for controlling a parameter of an internal filter depending on the channel characteristic detected by the channel characteristic detecting unit, to compensate the received signal for the channel distortion.

The channel estimating unit estimates the channel impulse response every field by using a training sequence included in a field synchronization signal whenever the field synchronization signal is inputted. Additionally, if the decision values are used as a training sequence, then the channel impulse response can be estimated during a data segment period as well as a field synchronization segment period. The channel estimation using a decision value enables more frequent channel estimation and it can be used to improve channel characteristic detection capability and equalizer performance.

The channel characteristic detecting unit includes: a memory for storing the channel impulse response estimated at the current time and outputted from the channel response estimated at the previous time; a subtractor for obtaining and outputting the difference between the channel impulse response estimated at the current time and outputted from the channel estimating unit and the channel impulse response estimated at the previous time and outputted from the memory; an arithmetic unit for obtaining the absolute value of the difference outputted from the subtractor, to obtain the amount of the channel variance; a summation unit for summing the amount of the channel variance outputted from the arithmetic unit, during a predetermined summation duration (N); and a comparator for comparing the summed value with a predetermined first threshold value to determine the channel characteristic as the dynamic channel if the summed value is greater than the first threshold value and determine the channel characteristic as the static channel if the summed value is not greater than the first threshold value, and outputting the determination result to the channel equalizing unit.

The channel characteristic detecting unit includes: a memory for storing the channel impulse response estimated at the current time and outputted from the channel estimating unit, and outputting the stored channel impulse response as the channel impulse response estimated at the previous time; a subtractor for obtaining and outputting the difference between the channel impulse response estimated at the current time and outputted from the channel estimating unit and the channel impulse response estimated at the previous time and outputted from the memory; an arithmetic unit for obtaining the absolute value or the square of the absolute value of the difference outputted from the subtractor, to obtain the amount of the channel variance; a summation unit for summing the amount of the channel variance outputted from the arithmetic unit, during the predetermined summation duration (N); an averaging unit for averaging the summed value over the several fields and outputting an average value of the summed value; and a comparator for comparing the average value with a predetermined second threshold value to determine the channel characteristic as the dynamic channel if the summed value is greater than the second threshold value and determine the channel characteristic as the static channel if the summed value is not greater than the second threshold value, and outputting the determination result to the channel equalizing unit.

The channel characteristic detecting unit includes: a memory for storing the channel impulse response estimated at the current time and outputted from the channel estimating unit, and outputting the stored channel impulse response as the channel impulse response estimated at the previous time; a subtractor for obtaining and outputting the difference between the channel impulse response estimated at the current time and outputted from the channel estimating unit and the channel impulse response estimated at the previous time and outputted from the memory; an arithmetic unit for obtaining the absolute value or the square of the absolute value of the difference outputted from the subtractor, to obtain the amount of the channel variance; a summation unit for summing the amount of the channel variance outputted from the arithmetic unit, during the predetermined summation duration (N); a comparator for comparing the summed value with a predetermined third threshold value; and a confidence counter for increasing or decreasing a count value depending on the compared result of the comparator and comparing the increasing or decreasing count value with a predetermined count threshold value to determine the channel characteristic as the dynamic channel if the count value is greater than the count threshold value and determine the channel characteristic as the static channel if the count value is not greater than the count threshold value, and outputting the determination result to the channel equalizing unit.

The channel equalizing unit performs a channel equalization while obtaining an error in G-Pseudo way if it is determined that the channel characteristic is the dynamic channel, and obtaining the error in Stop-and-Go way if it is determined that the channel characteristic is the static channel, to update a coefficient of a filter.

The channel equalizing unit performs the channel equalization while increasing a step-size if it is determined that the channel characteristic is the dynamic channel, and decreasing and providing the step-size less than in the dynamic channel if it is determined that the channel characteristic is the static channel, to update the coefficient of the filter.

According to another aspect of the present invention, there is provided a channel equalizing method of a channel equalizer of a digital broadcasting receiving system in which a digital broadcasting signal received over a channel is compensated for a channel distortion to recover an original signal, the method including the steps of: (a) estimating and outputting a channel impulse response from a signal received over a transmission channel, whenever a field synchronization signal is inputted; (b) comparing a difference between the outputted channel impulse response estimated at a current time and the channel impulse response estimated at a previous time with a predetermined threshold value, to determine as to whether a channel characteristic is a dynamic channel or a static channel; and (c) controlling a parameter of an internal filter of a channel equalizer depending on the determined channel characteristic to compensate for the channel distortion included in the received signal.

The step (b) includes the steps of: obtaining the difference between the channel impulse response estimated at the current time and the channel impulse response estimated at the previous time, and obtaining an absolute value or a square of the absolute value of the difference to calculate an amount of channel variance; summing the calculated amount of the channel variance during a predetermined summation duration (N); and comparing the summed value with a predetermined first threshold value to determine the channel characteristic as the dynamic channel if the summed value is greater than the first threshold value and determine the channel characteristic as the static channel if the summed value is not greater that the first threshold value.

The step (b) includes the steps of: obtaining the difference between the channel impulse response estimated at the current time and the channel impulse response estimated at the previous time, and obtaining an absolute value or a square of the absolute value of the difference to calculate the amount of the channel variance; summing the calculated amount of the channel variance during a predetermined summation duration (N) and then, averaging the summed value over several fields to output an average value of the summed value; and comparing the average value with a predetermined second threshold value to determine the channel characteristic as the dynamic channel if it is determined that the average value is greater than the second threshold value and determine the channel characteristic as the static channel if it is determined that the average value is not greater than the second threshold value. impulse response estimated at the current time and the channel impulse response estimated at the previous time, and obtaining an absolute value or a square of the absolute value of the difference to calculate the amount of the channel variance; summing the calculated amount of the channel variance during a predetermined summation duration (N) and then, averaging the summed value over several fields to output an average value of the summed value; and increasing a confidence if the summed value is more than a third threshold value, and decreasing the confidence if the summed value is not more than the third threshold value, and then comparing the confidence with a predetermined count threshold value to determine the channel characteristic as the dynamic channel if it is determined that the confidence is greater than the count threshold value and determine the channel characteristic as the static channel if it is determined that the confidence is not greater than the count threshold value.

In the step (c), when the channel equalizer performs a coefficient updating to perform a channel equalization, a step-size is increased if it is determined that the channel characteristic is the dynamic channel, and the step-size is decreased to be less than in the dynamic channel if it is determined that the channel characteristic is the static channel.

In the step (c), when the channel equalizer performs a channel equalization, an error is obtained in G-Pseudo way if it is determined that the channel characteristic is the dynamic channel, and the error is obtained in Stop-and-Go way if it is determined that the channel characteristic is the static channel, to update a coefficient of a filter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that a channel impulse response is estimated at each field synchronization signal periodically received, and the estimated previous impulse response and current impulse response are used to measure a degree of channel variation. Additionally, on the basis of the measured degree of the channel variation, it is determined as to whether the channel characteristic is the dynamic channel or the static channel and then, a parameter of a channel equalizer is controlled suitably to the determined channel characteristic.

Figure 2:
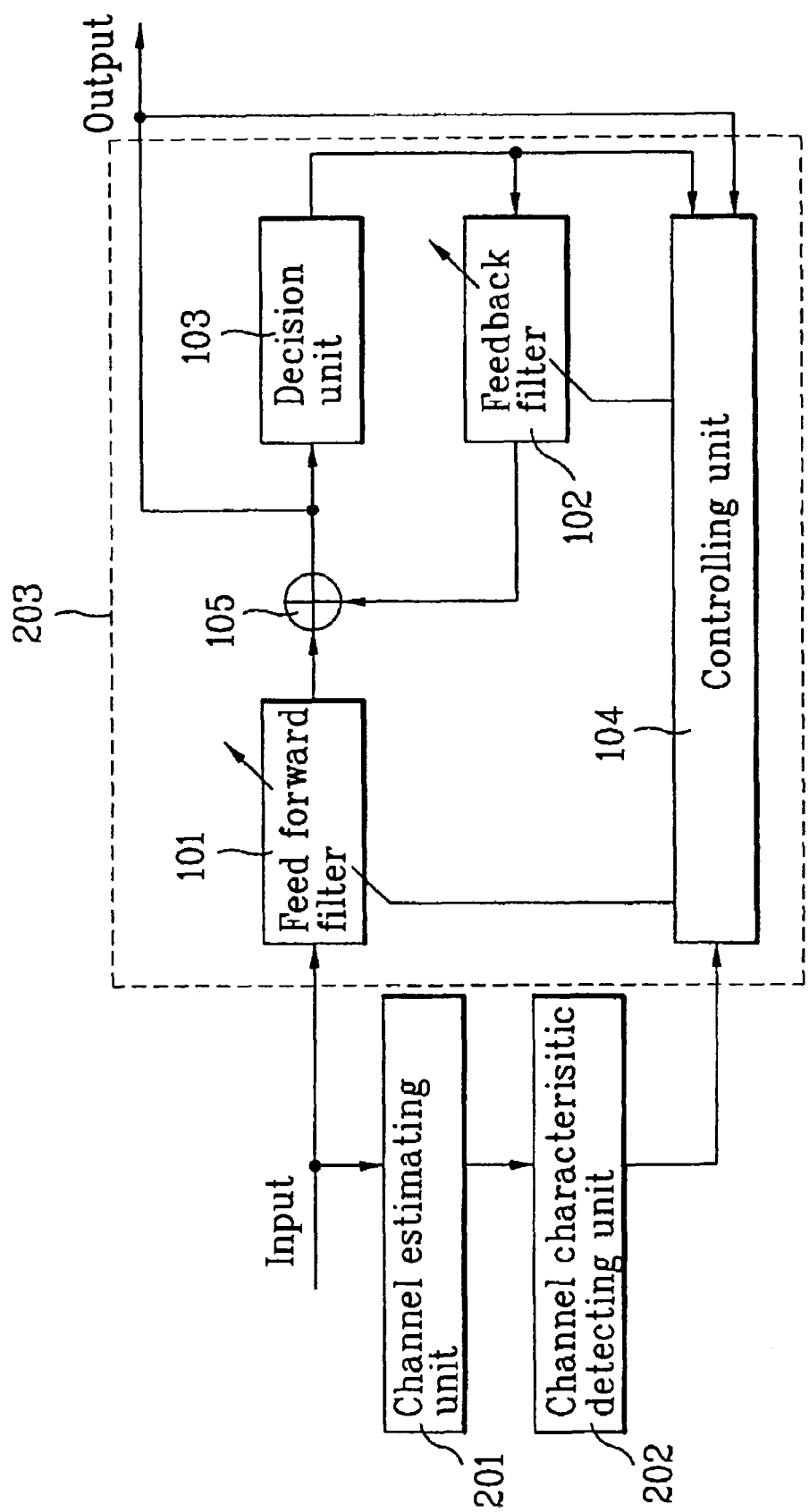
FIG. 2 is a block diagram illustrating a channel equalizing device according to the present invention.

FIG. 2 is a block diagram illustrating a channel equalizing device according to the present invention.

The channel equalizing device includes a channel estimating unit 201 for estimating and outputting a transmission channel impulse response from a signal received over a transmission channel whenever a field synchronization signal is inputted; a channel characteristic detecting unit 202 for determining as to whether a channel characteristic is a dynamic channel or a static channel from the channel impulse response outputted from the channel estimating unit 201; and a channel equalizing unit 203 for controlling the parameter of a filter depending on the channel characteristic detected by the channel characteristic detecting unit 202, to compensate for a channel distortion included in the received signal.

Figure 1:
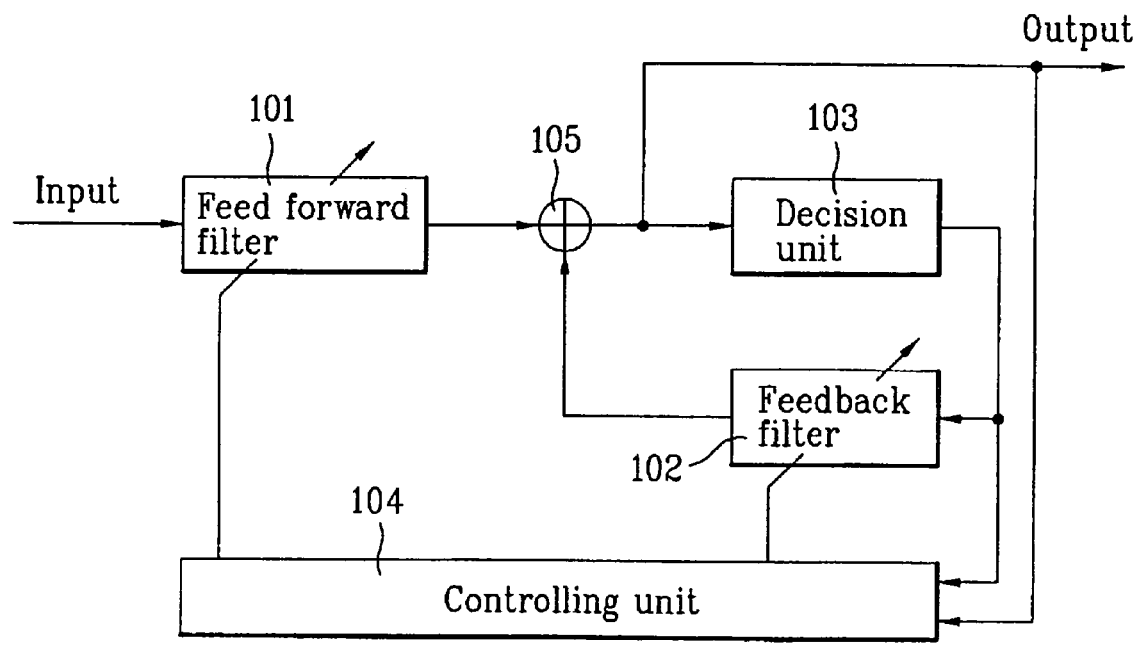
FIG. 1 is a block diagram illustrating a general channel equalizing device.

The channel equalizing unit 203 can also employ a construction of FIG. 1, and other channel equaling units known in the art can be also employed.

According to an embodiment of the present invention, the channel estimating unit and the channel characteristic detecting unit are used in a decision feedback equalizer of FIG. 1 to improve a performance of channel equalization. That is, the channel equalizing unit 203 includes a feed forward filter 101, a feedback filter 102, a decision unit 103, a controlling unit 104 and an adder 105 of FIG. 1.

The channel estimating unit 201 receives a signal u(n) to estimate an impulse response h(n) of a discrete equivalent channel through which an original signal x(n) seems to pass, and then output a finite impulse response estimation value ĥ(n) of a discrete equivalent channel to the channel characteristic detecting unit 202.

In other words, when it is assumed that a transmission signal is "x(n)", and the impulse response of the discrete equivalent channel is "h(n)", and a white noise is "w(n)", an input signal u(n) received through a digital broadcasting receiving system can be expressed as in the following Equation 1:

$$u(n) = \sum_k h(k) \cdot x(n-k) + w(n) \quad \text{[Equation 1]}$$

If so, the channel estimating unit 201 receives the signal u(n) to estimate the impulse response h(n) of the discrete equivalent channel, through which an original signal x(n) seems to pass, and then outputs the finite impulse response estimation value ĥ(n) of the channel to the channel characteristic detecting unit 202.

At this time, when the impulse response of the transmission channel is estimated in the channel estimating unit 201, a Simple Correlation Method (SCM) and a Least Square Method (LSM) can be used. In the present invention, a system designer can select one of the SCM and the LSM.

In other words, in the SCM, on the assumption that a training signal periodically added to the transmission signal is the white signal, a cross correlation value between the training signal passing through the channel and a known training signal of a receiving system is obtained to estimate the impulse response of the transmission channel.

Meanwhile, in the LSM, a cross correlation value (p) is obtained between a training signal passing through the channel during the training time and an already known training signal of the receiving system, and an autocorrelation matrix (R) of the training signal is obtained. After that, a matrix operation of $R^{-1} \cdot p$ is performed to eliminate an autocorrelation portion of the cross correlation value (p) of an original training signal and a reception signal, thereby estimating the impulse response of the transmission channel.

Figure 3:
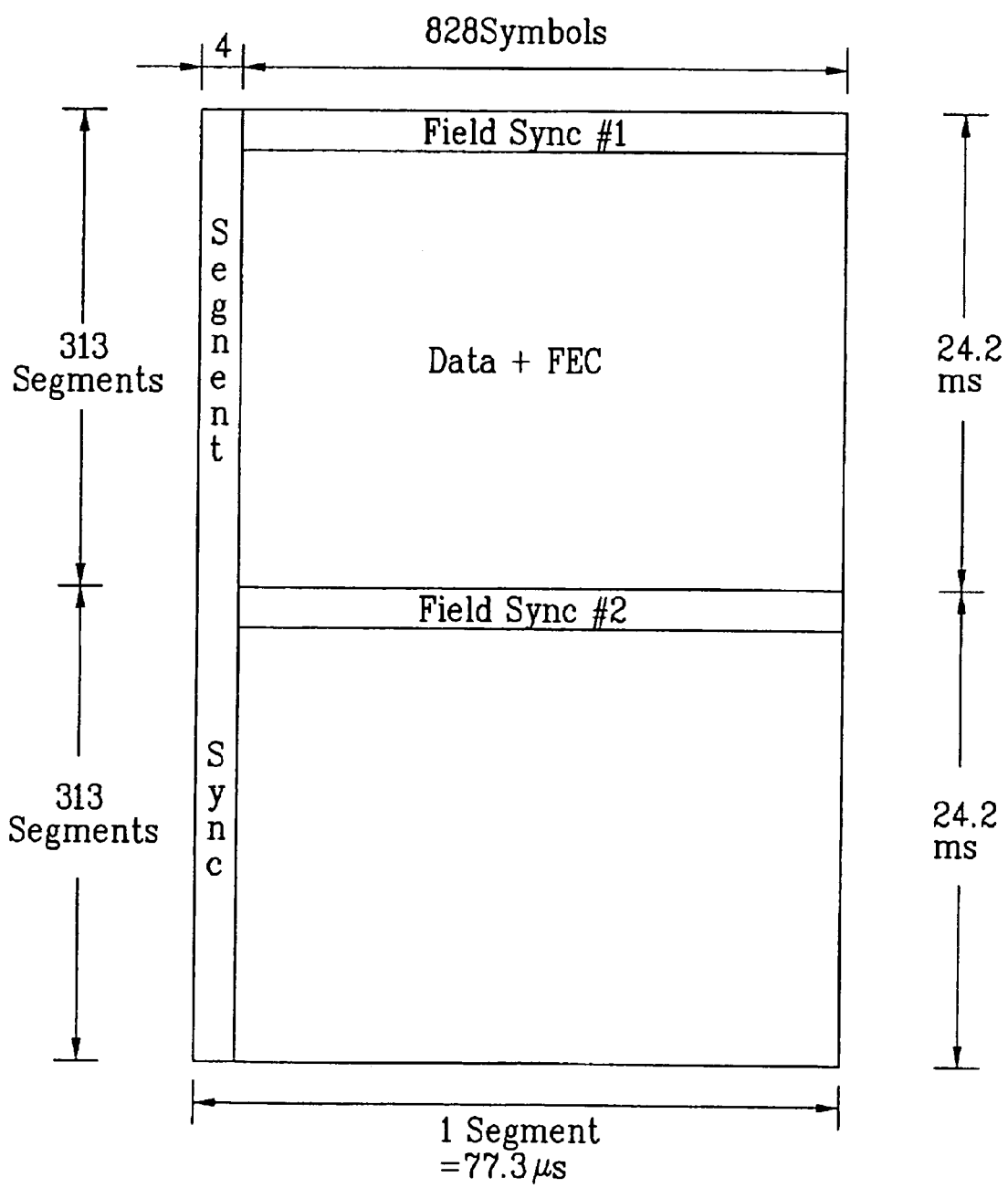
FIG. 3 is a view illustrating a structure of a data frame using a general VSB transmission system.

FIG. 3 is a view illustrating a structure of a data frame using a general ATSC 8T-VSB system. One data frame is comprised of an odd data field and an even data field, and each of data fields is again divided into 313 data segments. The 313 data segments are comprised of one field synchronization segment including a training sequence signal, and general 312 data segments. Additionally, each of data segments is comprised of four segment synchronization symbols and 828 data symbols.

Figure 4:
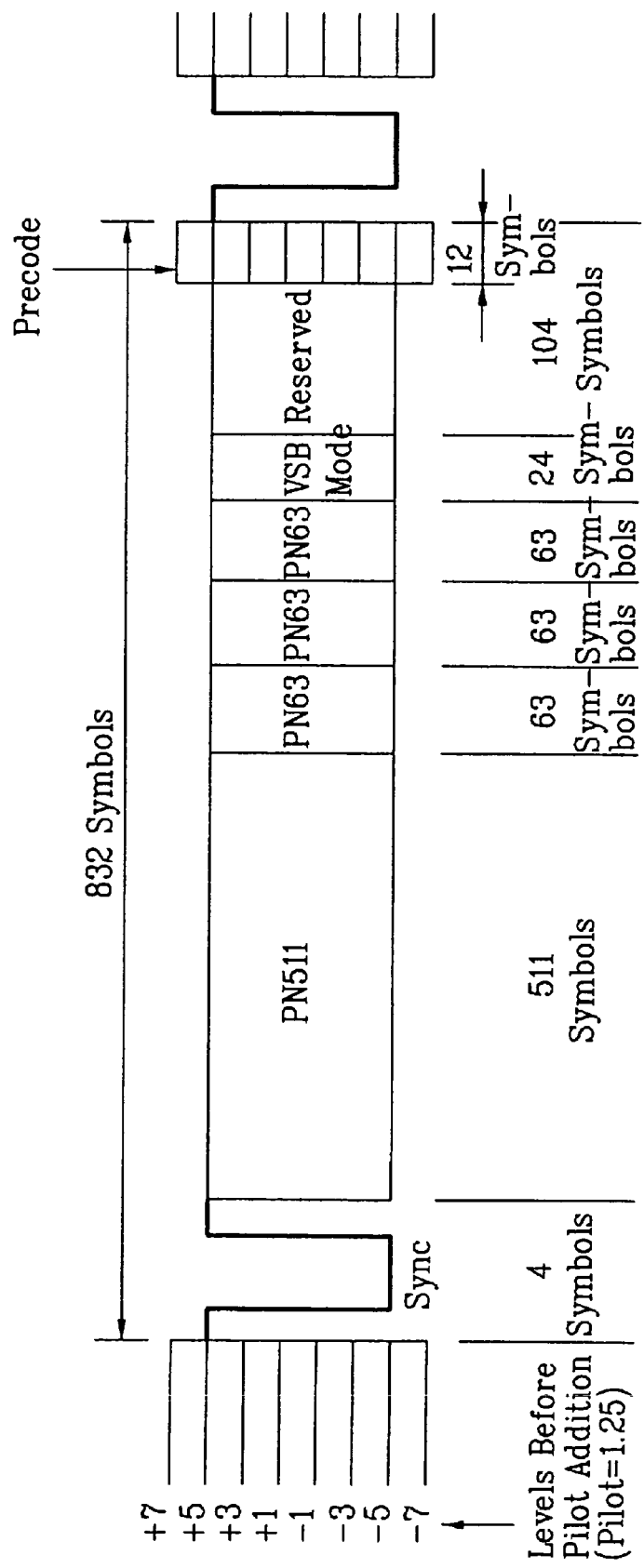
FIG. 4 is a view illustrating a structure of a field synchronization segment of FIG. 3.

FIG. 4 is a view illustrating a structure of the field synchronization segment of FIG. 3.

The field synchronization segment has a length of one data segment. In the field synchronization segment, first four symbols have a data segment synchronization pattern, next 511 symbols have a PN 511 being Pseudo Random Sequences, next three 63 symbols respectively have a PN 63, a PN 63 and a PN63, and next 24 symbols have information relating to a VSB mode. Here, the second PN 63 among three PN 63 durations has a polarity changed every time. That is, the polarity is changed from '1' to '0', and from '0' to '1'. Accordingly, depending on the polarity of the second PN 63, one frame can be divided into even/odd fields.

Additionally, remaining 104 symbols next to the 24 symbols having information relating to the VSB mode correspond to a reserved range. Last 12-symbol data of a previous segment is copied to the last 12 symbols of the reserved range (precode symbol).

At this time, since one data field is a period of about 24.2 ms, about 41.3 number of field synchronization segments are transmitted per second.

Accordingly, the channel estimating unit 201 estimates the channel impulse response in the SCM or the LSM by using the training sequence such as PN511 and PN63 whenever the field synchronization segment is received. Additionally, if the decision values are used as a training sequence, then the channel impulse response can be estimated during data segments as well as a field synchronization segment. The channel estimation during data segments enables more frequent channel estimation and it can be used to improve channel characteristic detection capability and equalizer performance.

Additionally, the channel characteristic detecting unit 202 compares a difference between the channel impulse response estimated at a current time and the channel impulse response estimated at a previous time, with a predetermined threshold value, to determine as to whether the channel characteristic is the dynamic channel or the static channel. Additionally, the determined channel characteristic is outputted to the controlling unit 104 of the channel equaling unit 203.

In other words, the difference between the channel impulse response estimated at the current time and the channel impulse response estimated at the previous time represents a degree of channel variation for one field. It is assumed that the channel impulse response estimated at the current time is $\hat{h}_t(n), n=0,1,\ldots,N-1$, and the channel impulse response estimated at the previous time is $\hat{h}_{t-1}(n)$. Here, "N" denotes a length of the estimated channel impulse response.

The difference (D(t,t−1)) between the channel impulse response estimated at the current time and the channel impulse response estimated at the previous time represents the channel variance, and can be calculated by an absolute value or a square of a difference between the two channel impulse responses as in the following Equation 2:

$$D(t, t-1) = \sum_{n=0}^{N-1} |\hat{h}_t(n) - \hat{h}_{t-1}(n)|$$ [Equation 2]

or $$D(t, t-1) = \sum_{n=0}^{N-1} |\hat{h}_t(n) - \hat{h}_{t-1}(n)|^2$$

At this time, in case where the channel is the static channel, that is, in case where there is not almost the variance, since the channel impulse response estimated at the current time is the same as the channel impulse response estimated at the previous time, an amount of channel variance is almost close to zero as in the following Equation 3:

$$\hat{h}_t(n) \approx \hat{h}_{t-1}(n) \Rightarrow D(t,t-1) \approx 0$$ [Equation 3]

Accordingly, the channel characteristic detecting unit 202 compares the amount of the channel variance with a predetermined threshold value to determine the channel characteristic as the static channel if the amount of the channel variance is less than or equal to the threshold value, and determine the channel characteristic as the dynamic channel if the amount is greater than the threshold value as in the Equation 4.

if $D(t,t-1) \leq$ threshold value, then static channel else dynamic channel [Equation 4]

Figure 5:
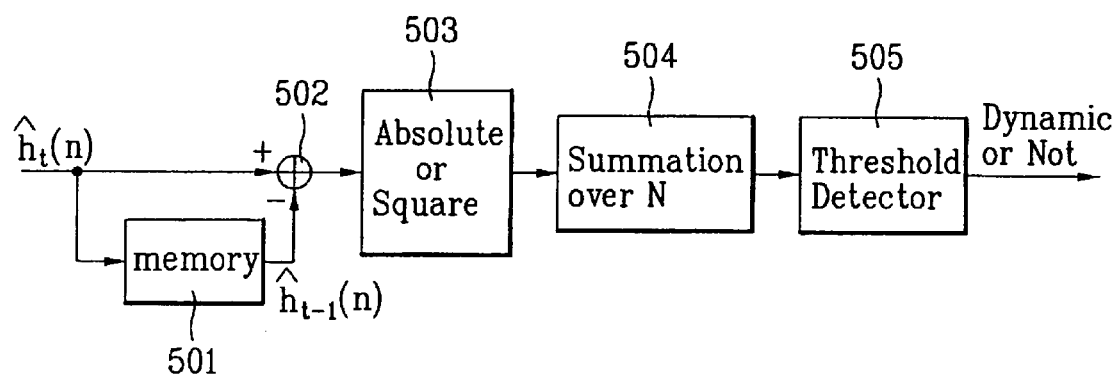
FIG. 5 is a detailed block diagram illustrating a channel characteristic detecting unit of FIG. 2 according to one embodiment of the present invention.
Figure 6:
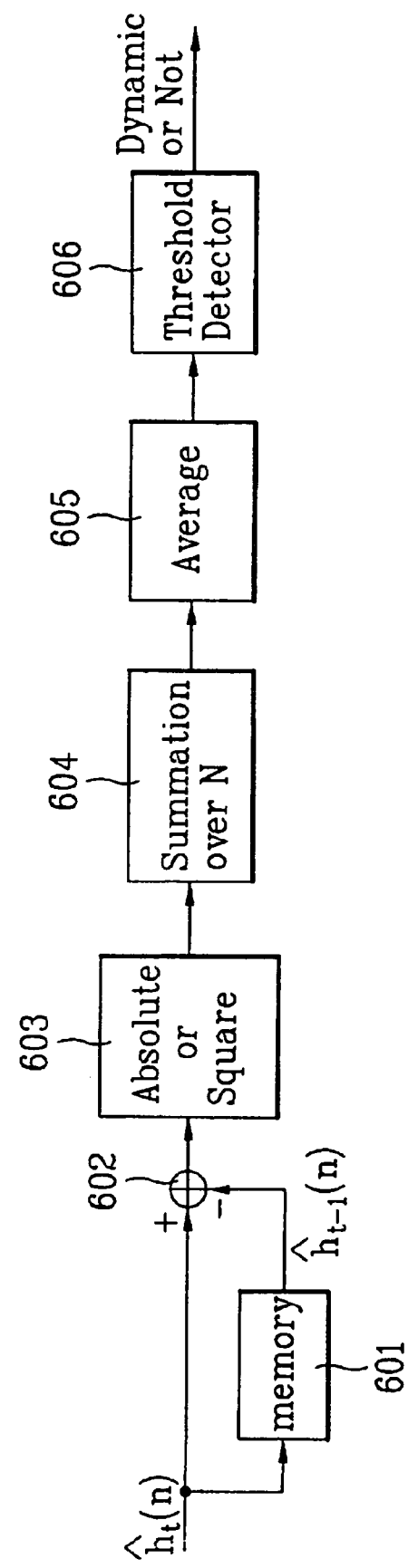
FIG. 6 is a detailed block diagram illustrating a channel characteristic detecting unit of FIG. 2 according to another embodiment of the present invention.
Figure 7:
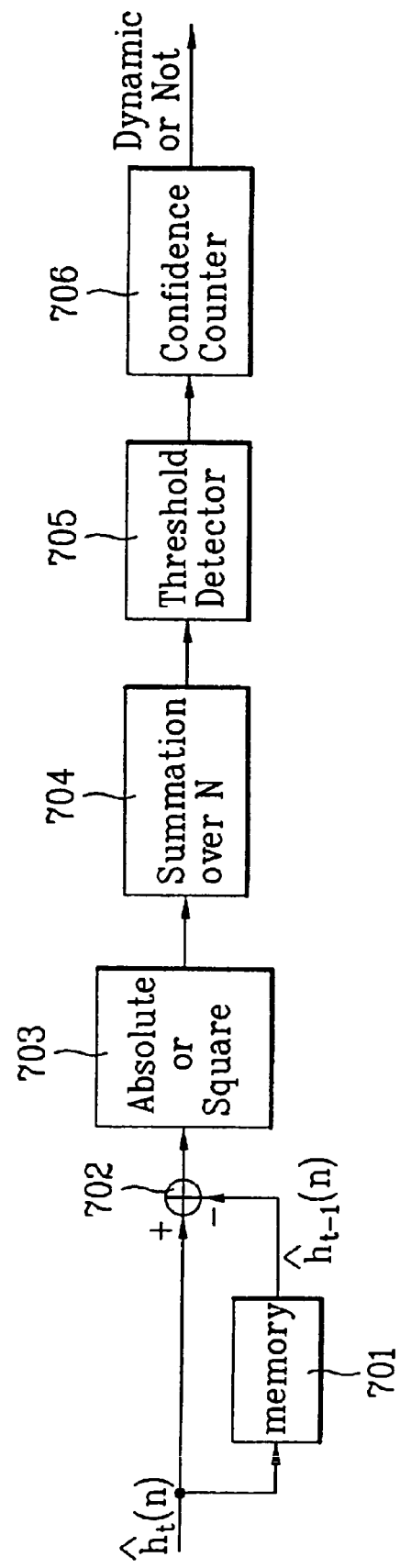
FIG. 7 is a detailed block diagram illustrating a channel characteristic detecting unit of FIG. 2 according to a further embodiment of the present invention.

FIGS. 5 to 7 are detailed block diagrams illustrating the channel characteristic detecting unit of FIG. 2 according to various embodiments of the present invention.

FIG. 5 is the detailed block diagram illustrating an example of the channel characteristic detecting unit employing the Equation 4. The channel characteristic detecting unit includes a memory 501 for storing the channel impulse response estimated at the previous time; a subtractor 502 for obtaining the difference between the inputted channel impulse response estimated at the current time and the stored channel impulse response estimated at the previous time to output the obtained difference; an arithmetic unit 503 for obtaining an absolute value of the outputted difference or obtaining a square of the absolute value of the outputted difference; a summation unit 504 for summing an output of the arithmetic unit 503 during a predetermined duration (N); and a comparator 505 for comparing the summed value with the predetermined threshold value to determine as to whether the channel characteristic is the dynamic channel or the static channel and output the determined result to the channel equalizing unit 203. In case where the estimated channel impulse response is provided in form of a complex number, the operated absolute value of the arithmetic unit 503 represents a Euclidean distance.

In FIG. 5, the subtractor 502 outputs the difference between the channel impulse response estimated at the current time and the stored channel impulse response estimated at the previous time to the arithmetic unit 503. The arithmetic unit 503 obtains the absolute value or the square of the absolute value of the difference between the two-channel impulse responses to output the obtained absolute value or square to the summation unit 504. The summation unit 504 sums the outputted absolute value or square over a length (N) of the impulse response. At this time, the summed value of the summation unit 504 corresponds to the amount of the channel variance (D(t, t−1)), and the comparator 505 compares the summed value with the predetermined threshold value to determine as to whether or not the dynamic channel and output the determination result to the channel equalizing unit 203.

However, in case where the amount of the channel variance (D(t, t−1)) is frequently varied in the vicinity of the threshold value, the amount of the channel variance can be averaged over several fields and compared with the threshold value so as to prevent the output of the channel characteristic detecting unit 202 from being frequently varied. At this time, as an available averaging way, there are a moving average way employing the following Equation 5 and a forgetting factor average way employing the following Equation 6:

$$D_{avg}(t, t-1) = \frac{1}{K} \sum_{k=t-K+1}^{t} D(k, k-1)$$ [Equation 5]

$$D_{avg}(t,t-1) = \lambda \cdot D_{avg}(t-1,t-1) + (1-\lambda) \cdot D(t,t-1)$$

where, 0≤forgetting factor≤1 [Equation 6]

FIG. 6 is the detailed block diagram illustrating an example of the channel characteristic detecting unit employing the Equation 5 or the Equation 6.

Referring to. FIG. 6, the channel characteristic detecting unit includes a memory 601 for storing the channel impulse response estimated at the previous time; a subtractor 602 for obtaining the difference between the inputted channel impulse response estimated at the current time and the stored channel impulse response estimated at the previous time to output the obtained difference; an arithmetic unit 603 for obtaining an absolute value of the outputted difference or obtaining a square of the absolute value of the outputted difference; a summation unit 604 for summing an output of the arithmetic unit 603 during a predetermined duration (N); an averaging unit 605 for averaging the summed value of the summation unit 604 over several fields to output an average value of the summed value; and a comparator 605 for comparing the outputted average value with the predetermined threshold value to determine as to whether the channel characteristic is the dynamic channel or the static channel and output the determined result to the channel equalizing unit 203.

In FIG. 6, the subtractor 602 outputs the difference between the channel impulse response estimated at the current time and the stored channel impulse response estimated at the previous time to the arithmetic unit 603. The arithmetic unit 603 obtains the absolute value or the square of the absolute value of the difference between the two-channel impulse responses to output the obtained absolute value or square to the summation unit 604. The summation unit 604 sums the outputted absolute value or square over a length (N) of the impulse response. The summed value of the summation unit 604 is outputted to the averaging unit 605.

The averaging unit 605 averages the summed value over several fields to output the average value. At this time, as an averaging way, a moving average way employing the above Equation 5 or a forgetting factor average way employing the above Equation 6 is used.

Additionally, the average value outputted from the averaging unit 605 is outputted to the comparator 606. The comparator 606 compares the average value with the predetermined threshold value to determine as to whether or not the dynamic channel and output the determination result to the channel equalizing unit 203.

Meanwhile, besides the averaging way of FIG. 6, after the average value is compared with the threshold value, a final determination for the compared result can be also performed using a confidence counter.

FIG. 7 is the detailed block diagram illustrating an example of the channel characteristic detecting unit employing the confidence counter.

Referring to FIG. 7, the channel characteristic detecting unit includes a memory 701 for storing the channel impulse response estimated at the previous time; a subtractor 702 for obtaining the difference between the inputted channel impulse response estimated at the current time and the stored channel impulse response estimated at the previous time to output the obtained difference; an arithmetic unit 703 for obtaining an absolute value of the outputted difference or obtaining a square of the absolute value of the outputted difference; a summation unit 704 for summing an output of the arithmetic unit 703 during a predetermined duration (N); a comparator 705 for comparing the outputted summed value with the predetermined threshold value; and a confidence counter 706 for increasing or decreasing a count value depending on the compared result of the comparator 705, and comparing the increasing or decreasing count value with the predetermined count threshold value (count_threshold) to determine as to whether the channel characteristic is the dynamic channel or the static channel and output the determined result to the channel equalizing unit 203.

In FIG. 7, the subtractor 702 outputs the difference between the channel impulse response estimated at the current time and the stored channel impulse response estimated at the previous time, to the arithmetic unit 703. The arithmetic unit 703 obtains the absolute value or the square of the absolute value of the difference between the two-channel impulse responses to output the obtained absolute value or square to the summation unit 704. The summation unit 704 sums the outputted absolute value or square over a length (N) of the impulse response. The summed value of the summation unit 704 is outputted to the comparator 705. The comparator 705 compares the summed value with the predetermined threshold value to output the compared result to the confidence counter 706.

If the comparator 705 determines that the summed value is greater than the predetermined threshold value, the confidence counter 706 increases the count value by a predetermined value, and otherwise, the confidence counter 706 decreases the count value by a predetermined value. Here, the increased or decreased count value can be arbitrarily determined by a designer. For example, the count value can be also designed to increase or decrease by 1 as in the embodiment of the present invention, or can be also designed to increase by 2 or decrease by 1. Since this is applicable more broadly and variously depending on the designer, it is not limited to the described examples.

After that, the count value is compared with a predetermined count threshold value. As the compared result, if the count value is beyond the count threshold value, it is determined that the channel characteristic is the dynamic channel.

In other words, in the confidence counter, if the amount of the channel variance otherwise, 481 the confidence count value is decreased by 1. When the count value of the confidence counter is beyond any count threshold value (count_threshold), it is determined that the channel characteristic is the dynamic channel.

if $D(t,t-1) \leq$ threshold value, then confidence counter value is decreased else confidence counter value is increased Here, $0 \leq$ confidence counter value $\leq$ count_max if confidence counter value $\leq$ count_threshold, then static channel else dynamic channel [Equation 7]

Hereinafter, a process of controlling the parameter in the controlling unit 104 of the channel equalizing unit 203 depending on the determined channel characteristic is described. In other words, the controlling unit 104 receives an output of a channel equalizer, that is, an output of the adder 105 and an output of the decision unit 103, and selects the parameter (for example, an error value, a step-size and the like) of a suitable channel equalizer to update coefficients of the feed forward filter 101 and the feedback filter 102.

Among the channel equalizers, a time-domain decision feedback equalizer and a frequency-domain LMS adaptive equalizer use a LMS algorithm in a filter coefficient updating way. That is, in the channel equalizer as in FIG. 2, the coefficient c(n) of the feed forward filter 101 and the feedback filter 102 is updated in a way where the following Equation 8 is employed. That is, a value, which is obtained by multiplying an input u(n) of a filter tap by an error e(n) and again multiplying the multiplied value of the input u(n) and the error e(n) by the step-size μ, is added to a current filter coefficient c(n) to update a next filter coefficient c(n+1).

$c(n+1)=c(n)+\mu \cdot u(n) \cdot e(n)$ where, e(n)=d(n)−y(n) [Equation 8]

In other words, in the Equation 8, "d(n)" denotes a desired signal. At the field synchronization segment duration, the training sequence is used, and at the data segment duration, a decision value determined in the decision unit 103 of FIG. 2 is used. A way of adapting the channel equalizer by subtracting an output y(n) of the channel equalizer from the desired signal as described above is called a decision-directed adaptive way.

Alternatively, in case where an initial convergence of the channel equalizer is difficult due to the heavy channel distortion, a blind adaptive way is used instead of the above-described decision-directed adaptive way. As a widely used blind adaptive way, there are G-Pseudo way (Albert Benveniste, Maurice Goursat, "Blind Equalizers", IEEE Tran. On Comm. Vol. COM-32, No. 8, August 1984) and Stop-and-Go way (Giorgio Picchi, Giancarlo Prati, "Blind Equalization and Carrier Recovery Using a Stop-and-Go Decision-Directed Algorithm", IEEE Tran. On Comm. Vol. COM-35, No. 9, September 1987). An error term of the Equation 8 is substituted as in the following Equations 9 and 10 to update the coefficient of the filter.

$e(n)=k_1 e_{DD}(n)+k_2 |e_{DD}(n)| e_{Blind}(n)$ [Equation 9]

$$e(n) = \begin{cases} e_{DD}, & \text{if } \text{sgn}[e_{DD}(n)] = \text{sgn}[e_{Blind}(n)] \\ 0, & \text{Otherwise} \end{cases}$$ [Equation 10]

In the Equation 9, the error is obtained using the G-Pseudo way, and in the Equation 10, the error is obtained using the Stop-and-go way. At this time, in case where the channel equalizing unit 203 is the same as in FIG. 2, the error is obtained in the controlling unit 104 to output the obtained error to the feed forward filter 101 and the feedback filter 102.

In the Equations 9 and 10, the following expressions are obtained:

$e_{DD}(n) = d(n) - y(n)$, and $$e_{Blind}(n) = \begin{cases} 5.25 - y(n), & \text{if } y(n) \rangle 0 \\ -5.25 - y(n), & \text{Otherwise} \end{cases}$$

Additionally, in the Equation 9, "k1" and "k2" respectively denote a constant. In the Equation 10, a function "sgn(x)" denotes a sign of "x". Further, the constants 5.25 and −5.25 are reference values when an 8-level VSB signal is provided as {−7, −5, −3, −1, +1, +3, +5, and +7}.

At this time, the G-Pseudo way of the Equation 9 has a fast initial convergence and has an excellent tracking performance in the dynamic channel, but is disadvantageous in the static channel due to a large output jitter of the channel equalizer. Whereas, the Stop-and-Go way of the Equation 10 has a slow initial convergence and a poor performance of the dynamic channel, but provides an excellent performance in the static channel due to a small output jitter of the channel equalizer.

Accordingly, if the parameter of the channel equalizer can be controlled depending on the channel characteristic determined in the channel characteristic detecting unit 202, a performance of channel equalization can be optimized. In other words, in case where it is determined that the channel characteristic is the dynamic channel in the channel characteristic detecting unit 202, the channel equalizing unit 203 obtains the error in the G-Pseudo way in the blind adaptive way. In case where it is determined that the channel characteristic is the static channel, the channel equalizing unit 203 obtains the error in the Stop-and-Go way to update the coefficient of the filter.

Further, when the coefficient of the filter is updated in the LMS way as in the Equation 8, the large step-size is used in the dynamic channel in comparison to the static channel, thereby improving the performance of the channel equalization.

Meanwhile, the frequency-domain LMS adaptive equalizer has ever been proposed by this applicant to overcome a disadvantage of the decision feedback equalizer, thereby improving the performance of the channel equalization.

The channel characteristic detector using the channel estimator according to the present invention is not limited only to the decision feedback equalizer, and is applicable to the frequency-domain LMS adaptive equalizer in the same manner.

Additionally, as the control parameter of the equalizer using the output of the channel characteristic detector, the step-size being the parameter of the equalizer and the selection of the blind adaptive way are described as above. This is just merely one embodiment, and the detected result of the channel characteristic detector is applicable to so many portions of ATSC 8T-VSB receiver.

As described above, the channel equalizing device and method of the digital broadcasting receiving system according to the present invention estimates the channel impulse response at each field synchronization signal periodically received, and measures the degree of the channel variance by using the estimated previous impulse response and current impulse response. On the basis of this, it is determined as to whether the channel characteristic is the dynamic channel or the static channel and then, the parameter of the channel equalizer is controlled suitably to the determined channel characteristic, thereby improving the performance of the channel equalization.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel equalizing device of a digital broadcasting receiving system in which a digital broadcasting signal received over a channel is compensated for channel distortion in order to recover an original signal, the device comprising:
    a channel estimating unit for estimating and outputting a channel impulse response of a signal which is received over a transmission channel;
    a channel characteristic detecting unit for determining whether a channel characteristic is a dynamic channel or a static channel by using a difference between a current channel impulse response and a previous channel impulse response; and
    a channel equalizing unit for controlling a parameter of an internal filter according to the channel characteristic determined by the channel characteristic detecting unit to compensate for the channel distortion in the received signal,
    wherein the channel equalizing unit performs a channel equalization to update a coefficient of the internal filter by one of:
    utilizing a blind adaptive method that obtains an error in G-Pseudo way if it is determined that the channel characteristic is the dynamic channel and obtains the error in Stop-and-Go way if it is determined that the channel characteristic is the static channel; and
    utilizing a method that increases a step-size if it is determined that the channel characteristic is the dynamic channel and decreases and provides the step-size that is less than in the dynamic channel if it is determined that the channel characteristic is the static channel.

2. The device of claim 1, wherein the channel estimating unit estimates the channel impulse response by using a training sequence during a field synchronization segment period and/or a decision value output from a decision unit during a data segment period.

3. A channel equalizing device of a digital broadcasting receiving system in which a digital broadcasting signal received over a channel is compensated for channel distortion in order to recover an original signal, the device comprising:
    a channel estimating unit for estimating and outputting a channel impulse response of a signal which is received over a transmission channel;
    a channel characteristic detecting unit for determining whether a channel characteristic is a dynamic channel or a static channel by using a difference between a current channel impulse response and a previous channel impulse response; and
    a channel egualizing unit for controlling a parameter of an internal filter according to the channel characteristic determined by the channel characteristic detecting unit to compensate for the channel distortion in the received signal,
    wherein the channel characteristic detecting unit detects an amount of channel variance by obtaining a square or an absolute value of the difference between the current channel impulse response and the previous channel impulse response, and one of:
    compares the detected amount of the channel variance with a predetermined threshold value to determine whether the channel characteristic is the dynamic channel or the static channel;
    averages the detected amount of the channel variance and then compares the averaged amount with a first threshold value to determine whether the channel characteristic is the dynamic channel or the static channel; and
    compares a confidence of the detected amount of the channel variance with a predetermined threshold value to determine whether the channel characteristic is the dynamic channel or the static channel.

4. The device of claim 3, wherein the channel characteristic detecting unit comprises:
    a memory for storing the channel impulse response estimated in the channel estimating unit and outputting the stored channel impulse response as the previous channel impulse response;
    a subtractor for obtaining and outputting the difference between the current channel impulse response output from the channel estimating unit and the previous channel impulse response output from the memory;
    an arithmetic unit for obtaining the absolute value of the difference output from the subtractor to obtain the amount of the channel variance;
    a summation unit for summing the amount of the channel variance output from the arithmetic unit during a predetermined summation duration (N); and
    a comparator for comparing a summed value with a predetermined first threshold value to determine the channel characteristic as the dynamic channel if the summed value is greater than the first threshold value or as the static channel if the summed value is not greater than the first threshold value, and outputting the determined channel characteristic to the channel equalizing unit.

5. The device of claim 4, wherein the arithmetic unit obtains the square of the absolute value of the difference output from the subtractor to obtain and output the amount of the channel variance to the summation unit.

6. The device of claim 4, wherein the predetermined summation duration (N) is a length of the estimated channel impulse response.

7. The device of claim 3, wherein the channel characteristic detecting unit comprises:
    a memory for storing the channel impulse response estimated and output from the channel estimating unit and outputting the stored channel impulse response as the previous channel impulse response;
    a subtractor for obtaining and outputting the difference between the current channel impulse response output from the channel estimating unit and the previous channel impulse response output from the memory;

an arithmetic unit for obtaining the absolute value or the square of the absolute value of the difference output from the subtractor to obtain the amount of the channel variance;

a summation unit for summing the amount of the channel variance output from the arithmetic unit during a predetermined summation duration (N);

an averaging unit for averaging a summed value and outputting an average value of the summed value; and a comparator for comparing the average value with a predetermined second threshold value to determine the channel characteristic as the dynamic channel if the summed value is greater than the second threshold value or as the static channel if the summed value is not greater than the second threshold value, and outputting the determined channel characteristic to the channel equalizing unit.

8. The device of claim 7, wherein the averaging unit obtains the average value of the summed value in a moving average way employing the following Equation:

$$D_{avg}(t, t-1) = \frac{1}{K} \sum_{k=t-K+1}^{t} D(k, k-1)$$

where $D_{avg}(t,t-1)$ is the average value of the summed value.

9. The device of claim 7, wherein the averaging unit obtains the average value of the summed value in a forgetting factor average way employing the following Equation:

$$D_{avg}(t,t-1) = \lambda \cdot D_{avg}(t-1,t-1) + (1-\lambda) \cdot D(t,t-1)$$

where $D_{avg}(t,t-1)$ is the average value of the summed value and $0 \leq$ forgetting factor $\leq 1$.

10. The device of claim 3, wherein the channel characteristic detecting unit comprises:

a memory for storing the channel impulse response output from the channel estimating unit and outputting the stored channel impulse response as the previous channel impulse response;

a subtractor for obtaining and outputting the difference between the current channel impulse response output from the channel estimating unit and the previous channel impulse response output from the memory;

an arithmetic unit for obtaining an absolute value or a square of the absolute value of the difference output from the subtractor to obtain the amount of the channel variance;

a summation unit for summing the amount of the channel variance output from the arithmetic unit during a predetermined summation duration (N);

a comparator for comparing a summed value with a predetermined third threshold value; and a confidence counter for increasing or decreasing a count value according to a comparison result from the comparator and comparing the increasing or decreasing count value with a predetermined count threshold value to determine the channel characteristic as the dynamic channel if the count value is greater than the count threshold value or as the static channel if the count value is not greater than the count threshold value, and outputting the determined channel characteristic to the channel equalizing unit.

11. The device of claim 10, wherein the confidence counter increases the count value if the comparator determines that the summed value is greater than the predetermined second threshold value or decreases the count value if the comparator determines that the summed value is not greater than the predetermined second threshold value, and then compares the increased or decreased count value with the predetermined count threshold value to determine the channel characteristic as the dynamic channel if the count value is beyond the count threshold value or as the static channel if the count value is not beyond the count threshold value.

12. A channel equalizing device of a digital broadcasting receiving system in which a digital broadcasting signal received over a channel is compensated for channel distortion in order to recover an original signal, the device comprising:

a channel estimating unit for estimating and outputting a transmission channel impulse response periodically by using a training sequence during a field synchronization segment period and/or a decision value output from a decision unit during a data segment period;

a channel characteristic detecting unit for determining whether a channel characteristic is a dynamic channel or a static channel by using a difference between a current channel impulse response output from the channel estimating unit and a previous channel impulse response output from a memory; and an adaptive channel equalizing unit for increasing a step-size if it is determined that the channel characteristic is the dynamic channel by the channel characteristic detecting unit or decreasing and providing the step-size less than in the dynamic channel if it is determined that a channel characteristic is the static channel by the channel characteristic detecting unit to update a coefficient of a filter and compensate for the channel distortion included in the received digital broadcasting signal.

13. A channel equalizing device of a digital broadcasting receiving system in which a digital broadcasting signal received over a channel is compensated for channel distortion in order to recover an original signal, the device comprising:

a channel estimating unit for estimating and outputting a transmission channel impulse response periodically by using a training sequence during a field synchronization segment period and/or a decision value output from a decision unit during a data segment period;

a channel characteristic detecting unit for determining whether a channel characteristic is a dynamic channel or a static channel by using a difference between a current channel impulse response output from the channel estimating unit and a previous channel impulse response output from a memory; and a blind-adaptive channel equalizing unit for obtaining an error in G-Pseudo way if it is determined that the channel characteristic is the dynamic channel by the channel characteristic detecting unit or obtaining the error in Stop-and-Go way if it is determined that a channel characteristic is the static channel the channel characteristic detecting unit to update a coefficient of a filter and compensate for the channel distortion included in the received digital broadcasting signal.

14. A channel equalizing method of a channel equalizer of a digital broadcasting receiving system in which a digital broadcasting signal received over a channel is compensated for channel distortion in order to recover an original signal, the method comprising:

estimating and outputting a channel impulse response periodically from a signal received over a transmission channel by using a training sequence during a field synchronization segment period and/or a decision value output from a decision unit during a data segment period;

comparing a difference between a current channel impulse response and a previous channel impulse response with a predetermined threshold value to determine whether a channel characteristic is a dynamic channel or a static channel; and controlling a parameter of an internal filter of a channel equalizer according to the determined channel characteristic to compensate for the channel distortion included in the received signal, wherein a channel equalization is performed by the channel equalizer to update a coefficient of the internal filter by one of:

utilizing a blind adaptive method that obtains an error in G-Pseudo way if the determined channel characteristic is the dynamic channel and obtains the error in Stop-and Go way if the determined channel characteristic is the static channel; and utilizing a method that increases a step-size if the determined channel characteristic is the dynamic channel and decreases and provides the step-size that is less than in the dynamic channel if the determined channel characteristic is the static channel.

15. A channel equalizing method of a channel equalizer of a diqital broadcasting receiving system in which a digital broadcasting signal received over a channel is compensated for channel distortion in order to recover an original signal, the method comprising:

estimating and outputting a channel impulse response periodically from a signal received over a transmission channel by using a training sequence during a field synchronization segment period and/or a decision value output from a decision unit during a data segment period;

comparing a difference between a current channel impulse response and a previous channel impulse response with a predetermined threshold value to determine whether a channel characteristic is a dynamic channel or a static channel; and controlling a parameter of an internal filter of a channel egualizer according to the determined channel characteristic to compensate for the channel distortion included in the received signal, wherein comparing the difference between the current channel impulse response and the previous channel impulse response with the predetermined threshold value determines an amount of channel variance by:

obtaining the difference between the current channel impulse response and the previous channel impulse response;

obtaining an absolute value or a square of the absolute value of the difference to calculate an amount of channel variance; and one of summing the calculated amount of the channel variance during a predetermined summation duration (N) and comparing the summed value with a predetermined first threshold value to determine the channel characteristic as the dynamic channel if the summed value is greater than the first threshold value and determine the channel characteristic as the static channel if the summed value is not greater than the first threshold value;

summing the calculated amount of the channel variance during a predetermined summation duration (N), averaging the summed value to output an average value of the summed value and comparing the average value with a predetermined second threshold value to determine the channel characteristic as the dynamic channel if it is determined that the average value is greater than the second threshold value and determine the channel characteristic as the static channel if it is determined that the average value is not greater than the second threshold value; and summing the calculated amount of the channel variance during a predetermined summation duration (N), averaging a summed value to output an average value of the summed value, increasing a confidence if the summed value is greater than a third threshold value and decreasing the confidence if the summed value is not greater than the third threshold value, and comparing the confidence with a predetermined count threshold value to determine the channel characteristic as the dynamic channel if it is determined that the confidence is greater than the count threshold value and determine the channel characterisitc as the static channel if it is determined that the confidence is not greater than the count threshold value.

16. The method of claim 15, wherein the average value of the summed value is obtained in a moving average way employing the following Equation:

$$D_{avg}(t, t-1) = \frac{1}{K} \sum_{k=t-K+1}^{t} D(k, k-1)$$

where $D_{avg}(t,t-1)$ is the average value of the summed value.

17. The method of claim 15, wherein the average value $D_{avg}(t,t-1)$ of the summed value is obtained in a forgetting factor average way employing the following Equation:

$$D_{avg}(t,t-1) = \lambda \cdot D_{avg}(t-1,t-1) + (1-\lambda) \cdot D(t,t-1)$$

where $D_{avg}(t,t-1)$ is the average value of the summed value and $0 \leq$ forgetting factor $\leq 1$.

* * * * *